(12) United States Patent
Ohzeki et al.

(10) Patent No.: US 7,675,701 B2
(45) Date of Patent: Mar. 9, 2010

(54) METHOD AND APPARATUS FOR DETECTING SERVO TIMING MARKS IN A MAGNETIC DISK SYSTEM

(75) Inventors: Hideki Ohzeki, Kanagawa (JP); Noboru Yoshida, Kanagawa (JP); Kazuyuki Ishibashi, Kanagawa (JP); Tetsuo Ueda, Kanagawa (JP); Isao Yoneda, Kanagawa (JP); Toshiaki Wada, Kanagawa (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 585 days.

(21) Appl. No.: 11/600,593

(22) Filed: Nov. 15, 2006

(65) Prior Publication Data
US 2007/0146919 A1    Jun. 28, 2007

(30) Foreign Application Priority Data
Nov. 16, 2005    (JP)    ............................. 2005-331369

(51) Int. Cl.
*G11B 5/09*    (2006.01)
(52) U.S. Cl. .......................................... 360/51; 360/39
(58) Field of Classification Search ....................... None
See application file for complete search history.

(56) References Cited

U.S. PATENT DOCUMENTS

| | | | | |
|---|---|---|---|---|
| 5,420,730 A | * | 5/1995 | Moon et al. ............. | 360/77.08 |
| 5,640,583 A | * | 6/1997 | Assouad et al. ............. | 713/600 |
| 6,710,957 B2 | * | 3/2004 | Nakasato ..................... | 360/51 |
| 6,724,552 B1 | * | 4/2004 | Sugawara et al. ............. | 360/51 |
| 7,042,666 B2 | * | 5/2006 | Blaum et al. .................. | 360/49 |
| 7,057,836 B1 | * | 6/2006 | Kupferman .................. | 360/51 |
| 2004/0125479 A1 | * | 7/2004 | Ehrlich ........................ | 360/39 |

FOREIGN PATENT DOCUMENTS

| JP | 08-031123 | 2/1996 |
|---|---|---|
| JP | 2000-311447 | 11/2000 |
| JP | 2002-150728 | 5/2002 |
| JP | 2002-197818 | 7/2002 |

* cited by examiner

*Primary Examiner*—Jason C Olson
(74) *Attorney, Agent, or Firm*—Townsend and Townsend and Crew LLP

(57) ABSTRACT

Detection capability of a servo timing mark (STM) is improved. Long STM is configured by pseudo-STM forming part of an AGC/PLL pattern and intrinsic STM. When a system can not recognize the intrinsic STM, it keeps a state that a sector detection window is opened, and is operated in a long STM detection mode to recognize the long STM, thereby generates an STM detection signal. After the STM detection signal has been generated, an STM detection window is closed, and the system is operated in an intrinsic STM detection mode. Since the long STM has longer bit length than the intrinsic STM, it has high discriminating power with respect to other bit patterns. Therefore, even if the sector detection window is remained to be in an opened state, bit strings of data sector, address information in a servo sector or the like is not falsely recognized.

18 Claims, 7 Drawing Sheets

(A)

(B)

METHOD AND APPARATUS FOR DETECTING SERVO TIMING MARKS IN A MAGNETIC DISK SYSTEM

CROSS-REFERENCES TO RELATED APPLICATIONS

The instant nonprovisional patent application claims priority to Japanese Patent Application No.: 2005-331369, filed Nov. 16, 2005 and incorporated by reference herein for all purposes.

BACKGROUND OF THE INVENTION

Embodiments in accordance with the present invention relate to a technique of improving recognition capability of servo timing mark (STM) in a magnetic disk system, and furthermore relates to a technique of improving recognition capability without increasing bit length of the STM.

In a magnetic disk system employing a data surface servo system (sometime called sector servo system or embedded servo system), servo sectors and data sectors are alternately arranged in a circumferential direction. When a data sector is accessed, a position of a magnetic head is controlled according to a signal reproduced from a servo sector. While the servo sector is indispensable for position control of the magnetic head in the magnetic disk system in the data surface servo system, since it is an usable region for recording user data, it desirably has a small area to the utmost.

In a servo sector, a pattern for recognizing a position of the servo sector is written, which is known as servo timing mark (STM) or servo address mark (SAM). When a system can not recognize the STM, the system is into a servo unlock state in which it can not perform servo control. Previously, when a system was into the servo unlock state, the system continuously opened a search window to operate a servo control circuit until it was able to detect the STM. Even if the search window was continuously opened, a unique pattern was selected for the STM so that the STM was able to be distinguished from all data patterns recorded in a magnetic disk, therefore the system was able to recognize the STM distinguishingly from reproduced servo data other than the STM and user data, and return into a servo lock state.

[Patent literature 1] JP-A-2000-311447.
[Patent literature 2] JP-A-8-31123.
[Patent literature 3] JP-A-2002-150728.

Regarding such a method, patent literature I discloses a technique that a detection circuit of an address mark (AM) continuously detects an AM pattern at start, and once the circuit detects the AM, it determines a detection range of the AM and detects the AM only within the range, so that false detection is prevented. The literature further describes that when the AM pattern is not detected in the detection range of the AM, the circuit is into a mode of continuously detecting the AM. Patent literature 2 discloses a technique that even if detection error of the address data of the servo occurs, AGC operation is performed from leading of servo information in a subsequent sector while counting timing by a counter. Patent literature 3 discloses a technique that the search window is temporally expanded to prevent occurrence of detection error of servo information.

In a technical field of servo control, in order to reduce areas occupied by the servo sectors in a recording surface of the magnetic disk, efforts of increasing frequency of servo data or decreasing a bit number of the servo data have been previously made. As sampling frequency of the servo data approaches frequency of user data by increasing the frequency of the servo data, when the system is into the mode of continuously detecting the STM in the servo unlock state, a situation that user data or servo data other than STM are falsely recognized as STM tends to occur. The same problem may occur when discriminating power of STM as a pattern is reduced as a result of decreasing the bit number of the servo data.

The detected STM is used as information indicating a reference position of each servo sector. Since the system performs servo control while recognizing a bit string detected following the STM as address information or positional information of the servo data, unless the system detects the STM at an accurate position, it can not perform the servo control. Thus, an object of embodiments in accordance with the present invention is to provide a magnetic disk system that is reduced in possibility of false detection of falsely recognizing other data as STM. Another object of embodiments in accordance with the present invention is to provide a magnetic disk system in which possibility of false detection of STM can be decreased without enlarging the area of the servo sector even if frequency of the servo sector is increased. Still another object of embodiments in accordance with the present invention is to provide a magnetic disk system in which possibility of false detection of STM can be decreased even if the bit number of the servo sector is decreased. Still another object of embodiments in accordance with the present invention is to provide a reproduction method of the servo data in such a magnetic disk system.

BRIEF SUMMARY OF THE INVENTION

Detection capability of a servo timing mark (STM) is improved Long STM is configured by pseudo-STM forming part of an AGC/PLL pattern and intrinsic STM. When a system can not recognize the intrinsic STM, it keeps a state that a sector detection window is opened, and is operated in a long STM detection mode to recognize the long STM, thereby generates an STM detection signal. After the STM detection signal has been generated, an STM detection window is closed, and the system is operated in an intrinsic STM detection mode. Since the long STM has longer bit length than the intrinsic STM, it has high discriminating power with respect to other bit patterns. Therefore, even if the sector detection window is remained to be in an opened state, bit strings of data sector, address information in a servo sector or the like is not falsely recognized.

DETAILED DESCRIPTION OF THE INVENTION

Figure 1:
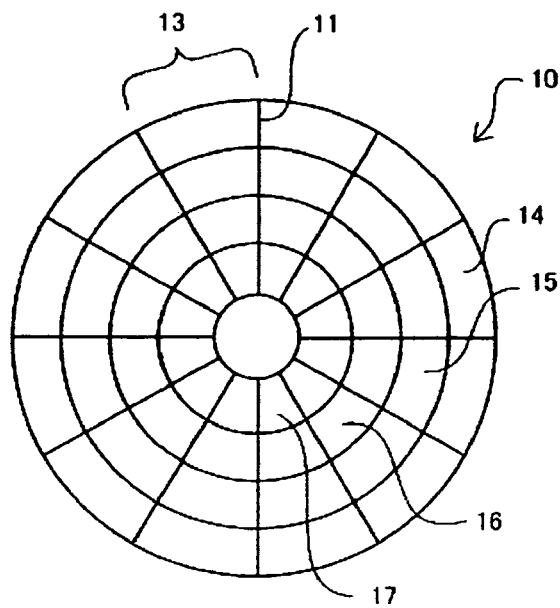
FIG. 1 is a view showing a format configuration of a magnetic disk according to an embodiment of the invention.
Figure 1:
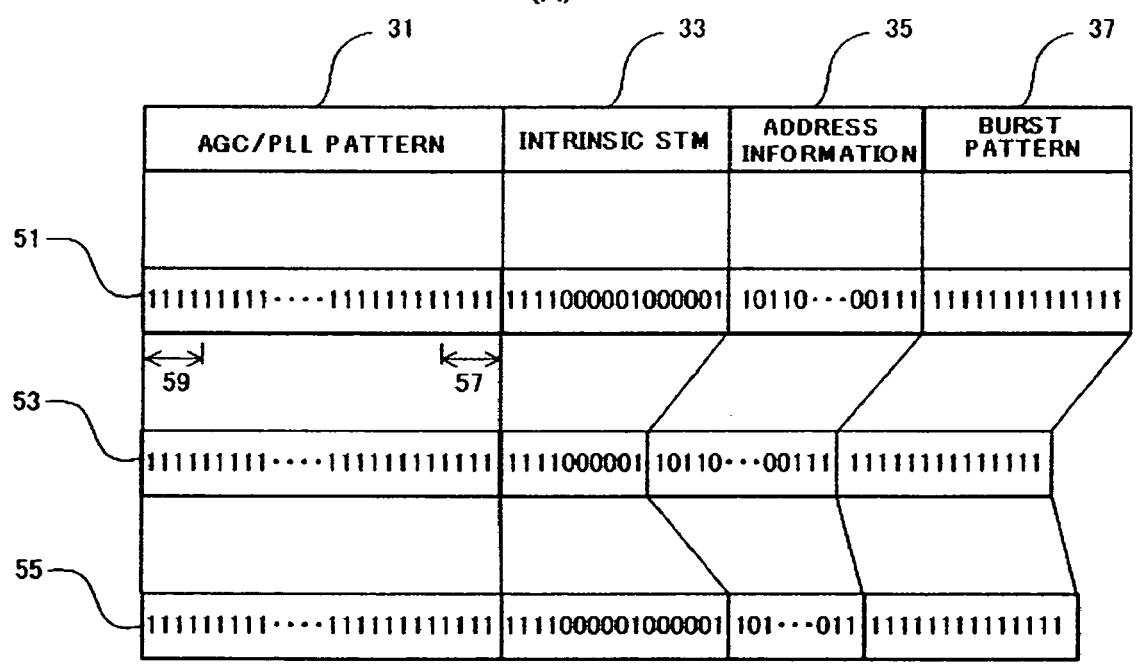

In a first aspect of embodiments in accordance with the present invention, part of an AGC/PLL pattern configures STM. Thus, possibility of false detection of recognizing other data as STM is decreased, because STM can be made into a more unique pattern with increase in bit length. On the other hand, since a storage area of a magnetic disk is reduced with increase in bit length, the bit length is restricted. Since the AGC/PLL pattern is corresponding to time inevitable for changing a mode of the magnetic disk system from recording operation of the user data to reproduction operation of the servo data, a leading portion is positioned as redundant bits. The STM is used as a reference signal for recognizing a position of the servo sector. When the STM is not recognized, recording or reproduction operation of the user data can not be performed. At that time, since the magnetic disk system is continuously operated in a reproduction mode to recognize the STM, time for switching between the recording operation and the reproduction operation is unnecessary, in addition, the redundant bits can be used for gain adjustment of AGC or phase synchronization adjustment of a servo clock.

When the AGC/PLL pattern is used from the leading in the case that the redundant bits are unnecessary, redundant bits are formed at a trailing side of the AGC/PLL pattern. In the invention, the redundant bits at the trailing side of the AGC/PLL pattern are used as pseudo-STM, the redundant bits being formed in the continuous reproduction operation mode of the servo data for recognizing the STM. When the original STM is assumed to be called intrinsic STM compared with the pseudo-STM, if long STM configured by the pseudo-STM and the intrinsic STM is used instead of STM, discrimination power for data other than the intrinsic STM can be improved without increasing bit length of the intrinsic STM, or deteriorating a function of the AGC/PLL pattern. When the pseudo-STM and the intrinsic STM are configured by continuous patterns, the STM detection circuit can easily recognize the long STM or the intrinsic STM from continuously inputted bit strings.

The STM detection signal is generated in both cases of detecting the long STM and detecting the intrinsic STM. Once the STM detection signal is generated, a sector detection window is set for subsequent servo sectors so that the servo data are reproduced; and once the STM is detected, the system is into the servo lock state in which the system can record or reproduce the user data. The sector detection window defines a period in which the magnetic disk system reproduces servo sectors. In a period while the sector detection window is closed, the servo data are not processed.

In the servo lock state, since only the intrinsic STM is recognized, the pseudo-STM can be used as the ACC/PLL pattern. Accordingly, since the redundant bits at the leading side of the ACC/PLL pattern can be worked, recording of the user data is not obstructed. When the intrinsic STM is not recognized, since the system can not specify a position of the servo sector, the sector detection window is kept in an opened state. At that time, a processing circuit of the servo data is inputted with all bit strings formed by reproducing the servo data and the user data. In the invention, since the system recognizes the long STM in this state, possibility of false detection can be reduced.

Since discriminating power of the long STM is high compared with that of the intrinsic STM, the area of the servo data can be reduced by removing the redundant bits from address information of the servo sector. Since a position of the servo sector can not be specified immediately after a magnetic head is loaded on a magnetic disk, the sector detection window is kept in the opened state. In the servo lock state, the sector detection window is set, in addition, the STM detection window is set. Therefore, even if the intrinsic STM having short bit length is designed to be recognized, false detection of other data is prevented.

A second aspect of the invention provides a reproduction method of the servo data when the STM can not be recognized after the sector detection window that defines the period in which the servo sectors are reproduced is set and the system is into the servo lock state. When the STM is not recognized in the servo lock state, an STM lost signal is generated and the system is into the servo unlock state. While the sector detection window has been kept in the opened state when the STM is not recognized, the sector detection window is closed in response to the STM lost signal in the invention.

The sector detection window is opened while measuring time from closing of the sector detection window in response to the STM lost signal to next opening of the sector detection window. When the sector detection window is opened, the STM detection window is set in response to it. Since the sector detection window in the servo unlock state is different in generation timing from that in the servo lock state, the above operation is called temporal setting of the sector detection window. The sector detection window is temporally set, thereby the STM detection circuit can be prevented from being inputted with bit strings of the user data or the servo data other than STM, therefore false recognition of STM is eliminated.

According to embodiments of the present invention, a magnetic disk system was able to be provided, in which possibility of false detection of falsely detecting other data as STM was decreased. Furthermore, according to the invention, a magnetic disk system was able to be provided, in which possibility of false detection of STM was able to be decreased without enlarging the area of the servo data even if frequency of the servo data was increased. Furthermore, according to the invention, a magnetic disk system was able to be provided, in which possibility of false detection of STM was able to be decreased even if the bit number of the servo sector was reduced. Still furthermore, according to the invention, a reproduction method of the servo data in such a magnetic disk system was able to be provided.

FIG. 1 is a view showing a format structure of a magnetic disk 10 used in a magnetic disk system according to an embodiment of the invention. The magnetic disk 10 is in a format structure used for a magnetic disk system employing the data surface servo system. As shown in FIG. 1(A), a plurality of servo sectors 11 extending radially in a radial direction are written in the magnetic disk 10. While simplified in the figure, the number of the servo sectors 11 is actually about 250 to 300. Data areas 13 are disposed between respective servo sectors 11, and a plurality of data sectors are defined in each data area 13.

Speed of a magnetic disk surface passing through a magnetic head becomes higher at more outer circumferential side. The recording bit number per unit length is made even to the utmost between an outer circumferential side and an inner circumferential side in order to increase storage capacity. To this end, the magnetic disk 10 is divided into four zones 14 to 17 in the radial direction. While the same number of data sectors are written into the data area 13 in each zone, the number of data sectors included in the data area 13 is increased with a zone at a more outer circumferential side, thereby frequency of recording current or write clock is increased.

The servo sector is written with servo data, and a reproduction signal of the servo data defines a plurality of concentric data tracks and data sectors on respective data tracks. Respective servo data are written at a constant frequency from an inner circumferential side to an outer circumferential side without being affected by the zones 14 to 17.

FIG. 1(B) shows a format structure of each servo sector, and bit patterns 51, 53 and 55 show bit configurations when the servo data are reproduced and digitized. Each servo sector 11 is configured by an AGC/PLL pattern 31, an intrinsic servo timing mark (intrinsic STM) 33, address information 35, and a burst pattern 37, and read by the magnetic head in order from the AGC/PLL pattern 31 to the burst pattern 37. In the embodiment, the magnetic disk 10 can be formatted such that the servo data correspond to one of the three bit patterns 51, 53 and 55.

The intrinsic STM 33 is 16-bit STM in the bit patterns 51 and 55, but 10-bit STM in the bit pattern 53. The address information 35 is in the same bit number including redundant bits in the bit patterns 51 and 53 respectively, however, it is short by removing the redundant bits in the bit pattern 55 compared with the patterns 51 and 53. The servo data other than the intrinsic STM 33 and the address information 35 are designed to be the same in the three bit patterns 51, 53 and 55.

The AGC/PLL pattern 31 is used for adjusting gain of an automatic gain controller (AGC) forming a read/write channel, and performing phase synchronization adjustment of servo clock used for reading subsequent servo data. In the AGC/PLL pattern 31, a digitized reproduction signal is written into the servo sector in a pattern of a series of 1 (1 corresponds to a state that voltage of an analog reproduction signal is generated, which is assumed to be the same hereinafter). A trailing portion of the AGC/PLL pattern 31 is used as 4-bit pseudo-STM 57. The intrinsic STM 33 is a term selected for clearly describing the invention compared with the pseudo-STM 57.

The intrinsic STM 33 is a bit pattern recognized in the servo lock state, as described later. Redundant bits 59 of 4 bits are defined at a leading side of the AGC/PLL pattern 31. The redundant bits 59 are provided for securing time necessary for changing an operation mode of a system such as a read/write channel or a head amplifier from recording operation of the user data to reproduction operation of the servo data. During the recording operation, the pattern is not read for gain adjustment of AGC or phase synchronization adjustment of the servo clock. In the embodiment, the bit number of the pseudo-STM 57 is designed to correspond to that of the redundant bits 59.

The intrinsic STM 33 is sometimes called servo address mark (SAM) or servo mark (SM), and a reproduction signal of it indicates a position of the servo sector. The reproduction signal of the intrinsic STM 33 is used as a reference signal for processing the servo data, setting the sector detection window, or generating a read gate signal (RG signal) or a write gate signal (WG signal). The pseudo-STM 57 includes 4 bits of 1111 in the embodiment, and has a function of complementing the intrinsic STM 33 in addition to a function of a part of the AGC/PLL pattern 31.

The intrinsic STM 33 is a 16-bit pattern in which a digital value of the reproduction signal is 1111000001000001 in the bit patterns 51 and 55, and is in a 10-bit configuration by removing low-order 6 bits (000001) in the bit pattern 53. While the intrinsic STM 33 is selected to be in a unique pattern that is not present in other servo data or the user data in both of bit patterns 51 and 53, a bit string of other servo data or a bit string of the user data is falsely recognized as the intrinsic STM 33 at higher possibility with decrease in bit number. In the embodiment, a bit string of 20 bits in a combination of the 4-bit pseudo-STM 57 and the 16-bit intrinsic STM 33 is called long STM.

The address information 35 is configured by a servo sector number indicating a position in a circumferential direction of the servo sector and a cylinder number written in a gray code to indicate a position in a radial direction of a servo track, and used for specifying a position of the servo sector or the data sector. The servo sector number shows an absolute value of the servo sector in the circumferential direction, and a position of the subsequent data sector can be specified using the servo sector number as a reference. The cylinder number is configured by an 18-bit cylinder bits necessary for specifying all cylinders in the magnetic disk and redundant bits added thereto. The redundant bits are a pattern of 1 added to the cylinder bits to distinguish between the cylinder number and the intrinsic STM 33 in a manner that successive five 0s are not present in the cylinder bits.

The burst pattern is configured by four patterns of A, B, C and D disposed such that phases of reproduction signals are different in a radial direction, and is used for correcting displacement of the magnetic head to a target position in the radial direction for following operation to tracks. A position error signal (PES) is calculated from amplitude of analog signals generated by reproducing the four burst patterns. While an analog reproduction signal is used for the burst pattern, and the pattern becomes 1 when it is digitized. Digital values by reproducing the burst patterns of A, B, C and D in a STM detection mode may represent the same bit pattern as that of the intrinsic STM 33 by combining 1s and 0s depending on a position of a reproduction head.

Figure 2:
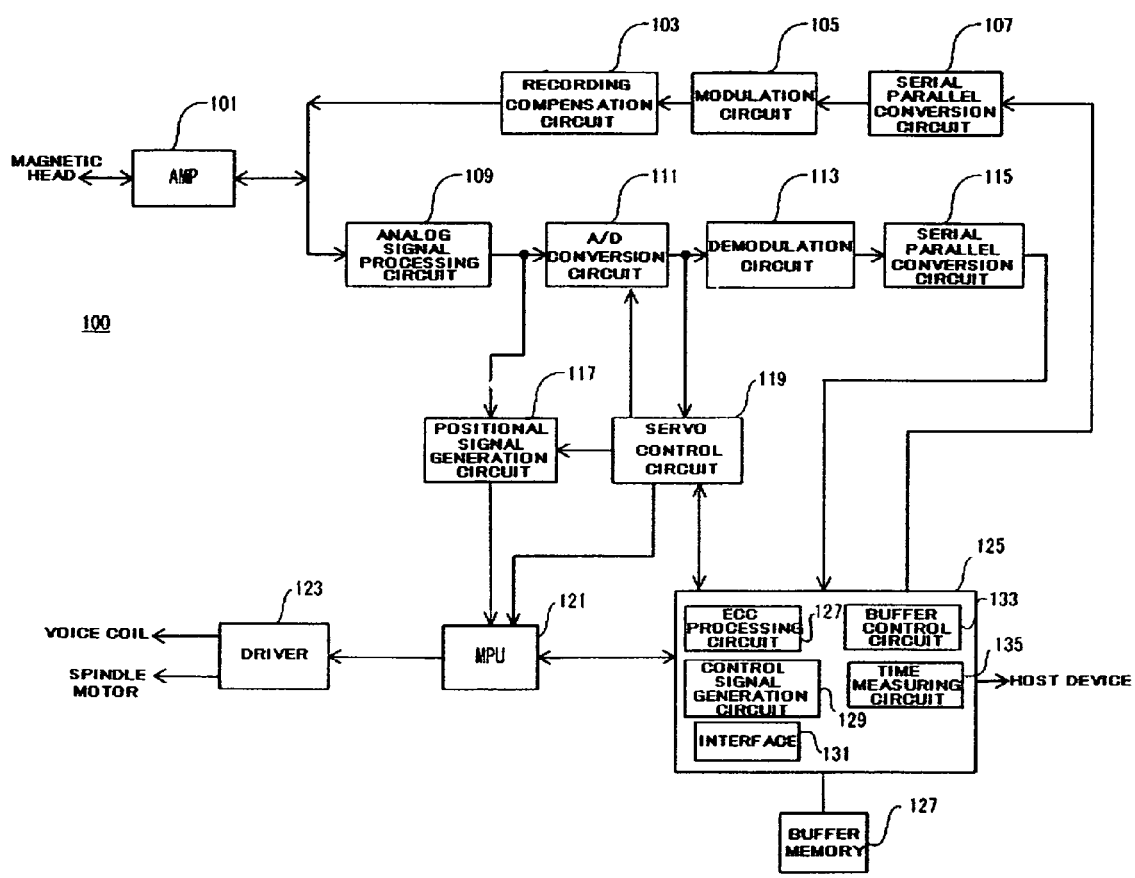
FIG. 2 is a schematic block diagram showing a configuration of a magnetic disk system 100.

FIG. 2 is a schematic block diagram showing a configuration of a magnetic disk system 100 according to an embodiment of the invention. A head amplifier 101 is connected to a magnetic head formed on a head/slider, and incorporates a write driver for recording data by amplifying recording current corresponding to write clock, a read amplifier for amplifying reproduction signals of user data and servo data, and a head selection circuit. When a hard disk controller (HDC) 125 asserts the WG signal, drive current is supplied to a recording head selected by the head amplifier 101. When the HDC 125 asserts the RG signal or negates the WG signal, magnetic recording information in a servo sector or a data sector passing under the selected reproduction head is reproduced.

A serial parallel conversion circuit 107 converts parallel data in byte sent from the HDC 125 into serial data in bit. A modulation circuit 105 converts a bit string of recording data sent from the HDC 125 into a recording code in a RLL method. A recording compensation circuit 103 adjusts timing at which recording current is flown to compensate change of a magnetic transition point of data to be recorded later due to a demagnetizing field of data recorded on the magnetic disk. The serial parallel conversion circuit 107, modulation circuit 105, and recording compensation circuit 103 configures a write channel.

An analog signal processing circuit 109 is a circuit for processing a reproduction signal received from the head amplifier 101, and configured by AGC, a wavelength equivalent circuit (equalizer) and the like. An analog/digital conversion circuit (A/D conversion circuit) 111 samples an analog reproduction signal of the user data received from the analog signal processing circuit 109 by read clock and converts the signal into digital data. The read clock is supplied from a not-shown PLL circuit for reproduction.

Moreover, the A/D conversion circuit 111 samples an analog reproduction signal of servo data received from the analog signal processing circuit 109 by the servo clock supplied from the servo control circuit 119 and converts the signal into digital data. A demodulation circuit 113 converts the RLL code received from the A/D conversion circuit 111 into user data. A serial parallel conversion circuit 115 converts serial data in bit into parallel data in byte and outputs the data to the HDC 125. The analog signal processing circuit 109, A/D conversion circuit 111, demodulation circuit 113, and serial parallel conversion circuit 115 configure a read channel. The write channel and the read channel are collectively called read/write channel.

The HDC 125 includes an interface circuit 131, a control signal generation circuit 129, an ECC processing circuit 127, a buffer control circuit 133, and time measuring circuit 135. The interface circuit 131 acts to transfer a command or data with respect to a host device, MPU 121 and the read/write channel. When the control signal generation circuit 129 receives a start signal from the servo control circuit 119, it generates the RG signal or the WG signal according to instruction of write or read from the host device, and then sends the signal to the read/write channel. The buffer control circuit 133 controls a buffer memory 127.

The time measuring circuit 135 is configured by a programmable pulse counter, and when the circuit 135 receives a start signal from the servo control circuit 119, it measures time T1 for obtaining timing of opening the sector detection window, which defines a period in which subsequent servo sectors are reproduced. When the time measuring circuit 135 receives the STM lost signal from the servo control circuit 119, it measures time T2 for obtaining timing of opening the sector detection window. When the time measuring circuit 135 has measured the time T1 or the time T2, it sends a window open signal to the servo control circuit 119. As described later, when the time measuring circuit 135 measures the time T1, the system is in a servo lock state in which the sector detection window is set; and when it measures the time T2, the system is in a servo unlock state in which the sector detection window is temporally set.

The buffer memory 127 temporally stores data when data are transferred between the host device and the magnetic disk system. The MPU 121 receives a command from the HDC 125, and controls operation of the overall magnetic disk system. When the MPU 121 receives a servo interrupt signal from the servo control circuit 119, it starts servo processing. The servo processing is performed based on the address information sent from the servo control circuit 119 and a positional signal sent from a positional signal generation circuit 117. The MPU 121 outputs a signal for controlling a position of the magnetic head to a driver circuit 123 for seek operation or track following operation. The driver circuit 123 includes a voice coil motor for moving the magnetic head and a driver for driving a spindle motor for rotating the magnetic disk. The positional signal generation circuit 117 generates amplitude values of analog reproduction signals to the four burst patterns 37 received from the analog signal processing circuit 109 and digitizes the signals, and then sends the signals to the MPU 121.

Figure 3:
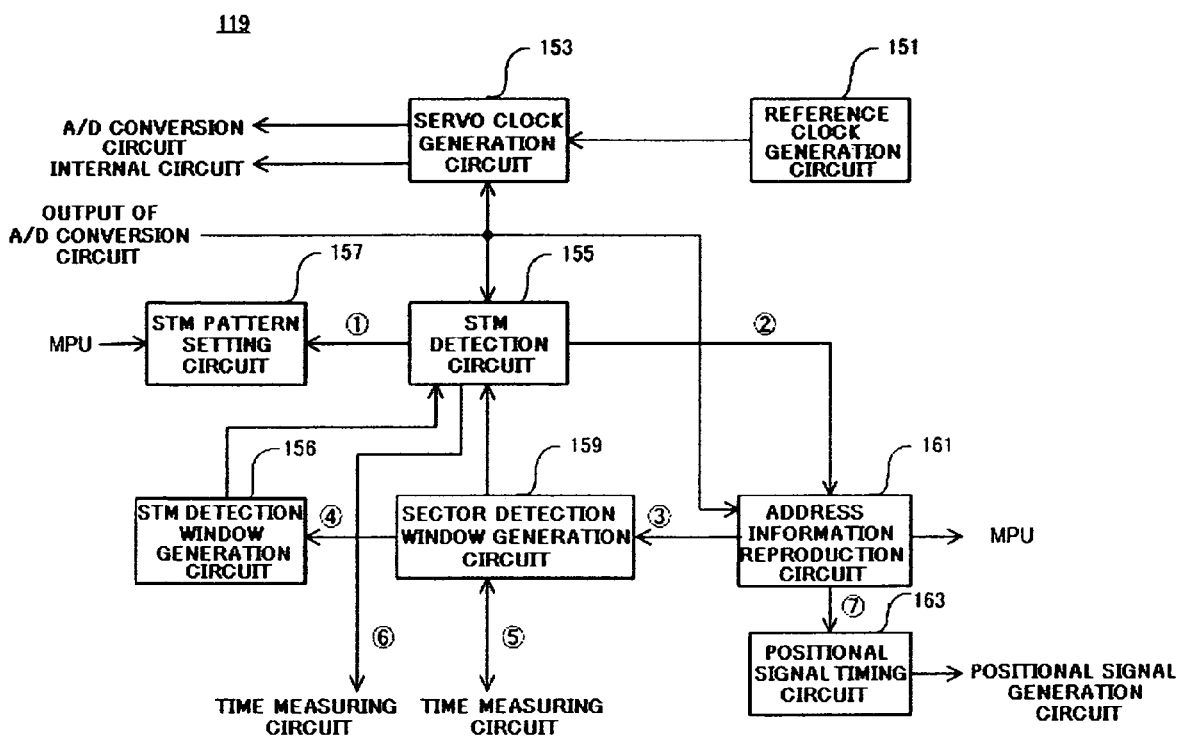
FIG. 3 is a schematic block diagram showing a configuration of a servo control circuit.

The servo control circuit 119 is described with reference to FIG. 3. In FIG. 3, a reference clock generation circuit 151 is configured by a crystal oscillator, and generates a reference clock in a single frequency. A servo clock generation circuit 153 generates servo clock formed by synchronizing frequency and a phase of the reference clock to those of a clock formed by reproducing the AGC/PLL pattern 31, and sends the servo clock to components of the servo control circuit 119. Furthermore, the servo clock generation circuit 153 sends a sampling clock in a frequency 8 times higher than the servo clock to the analog/digital signal circuit 111 to digitize the reproduction signal of the servo data.

In the embodiment, frequency of the servo data is increased from previous 80 MHz to 110 MHz in order to reduce the area of the servo sectors and thus increase the storage capacity of user data. Therefore, sampling frequency of the servo data is 880 MHz. In the outermost zone 14 of the magnetic disk 10, frequency of the user data is 800 MHz to 900 MHz, which is thus approached by the sampling frequency of the servo data. Therefore, unless a pattern of the intrinsic STM 33 is long in a degree that it can be sufficiently distinguished from other patterns, when the user data are reproduced at the sampling frequency of the servo data, the same bit string as that of the intrinsic STM 33 may be detected from the user data at comparatively high possibility.

An STM detection circuit 155 determines whether it recognizes a bit pattern of the intrinsic STM 33 or recognizes a bit pattern of the long STM on referring to a status register of an STM pattern setting circuit 157. The STM detection circuit 155 recognizes the bit pattern of the intrinsic STM 33 from the reproduction signal of the servo data received from the AID conversion circuit 111 and generates an STM detection signal, and then sends the signal to the STM pattern setting circuit 157 and an address information reproduction circuit 161. Moreover, the STM detection circuit 155 recognizes the long STM in a combination of the pseudo-STM 57 and the intrinsic STM 33 from the reproduction signal of the servo data received from the AID conversion circuit 111 and generates an STM detection signal, and then sends the signal to the STM pattern setting circuit 157 and an address information reproduction circuit 161. When the STM detection circuit 155 does not recognize the bit pattern of the intrinsic STM 33 within a period set by the STM detection window, it generates the STM lost signal and sends it to the STM pattern setting circuit 157 and the time measuring circuit 135 of the HDC 125.

The STM pattern setting circuit 157 has the status register for setting either an intrinsic STM detection mode in which he STM detection circuit 155 recognizes bit strings of the intrinsic STM 33 t or a long STM detection mode in which the circuit 155 recognizes bit strings of the long STM. Write into the status register is performed by the STM detection circuit 155 or the MPU 121. When an address information reproduction circuit 161 receives the STM detection signal from the STM detection circuit 155, it reproduces the address information 35 received from the AID conversion circuit 111, and then sends it to the MPU 121. When the address information reproduction circuit 161 has completed processing of all bit strings included in the address information 35, it sends a window close signal to a sector detection window generation circuit 159, and sends an operation start signal to a positional signal timing circuit 163.

The sector detection window generation circuit 159 generates a sector detection window for allowing the servo control circuit 119 to perform processing of servo data only for a period while a servo sector passes through the reproduction head. The sector detection window generation circuit 159 receives the window open signal from the time measuring circuit 135 of the HDC 125 and thereupon opens the sector detection window, and receives the window close signal from the address information reproduction circuit 161 and thereupon closes the sector detection window. The sector detection window generation circuit 159 sets respective components in the servo control circuit 119 to be in an operable state at timing when the sector detection window is opened, and stops operation of the respective components at timing when the sector detection window is closed. This state is called state where the sector detection window is set.

When the sector detection window is set and the intrinsic STM is recognized, the system is in a servo lock state. The sector detection window is opened at a start position of each servo sector, and closed at a start position of each data sector, thereby a period in which the servo sector is reproduced is defined. The servo control circuit 155 performs signal processing of servo data only for a period while the sector detection window is opened. The sector detection window generation circuit 159 sends a start signal to the time measuring circuit 135 of the HDC 125 at the timing when the sector detection window is closed.

The sector detection window generation circuit 159 has a pulse counter, and measures predetermined time from opening of the sector detection window by the pulse counter, and then sends the window open signal to an STM detection window generation circuit 156. The STM detection window generation circuit 156 generates an STM detection window that defines a period necessary for recognizing the intrinsic STM 33. The STM detection window generation circuit 156 has a pulse counter, and measures predetermined time from opening the STM detection window according to the window open signal by the pulse counter, and then closes the STM detection window. The positional signal timing circuit 163 receives an operation start signal form the address information reproduction circuit 161, and thereupon generates a window for reproducing the burst patterns A, B, C and D, and then sends the window to the positional signal generation circuit 117.

Figure 4:
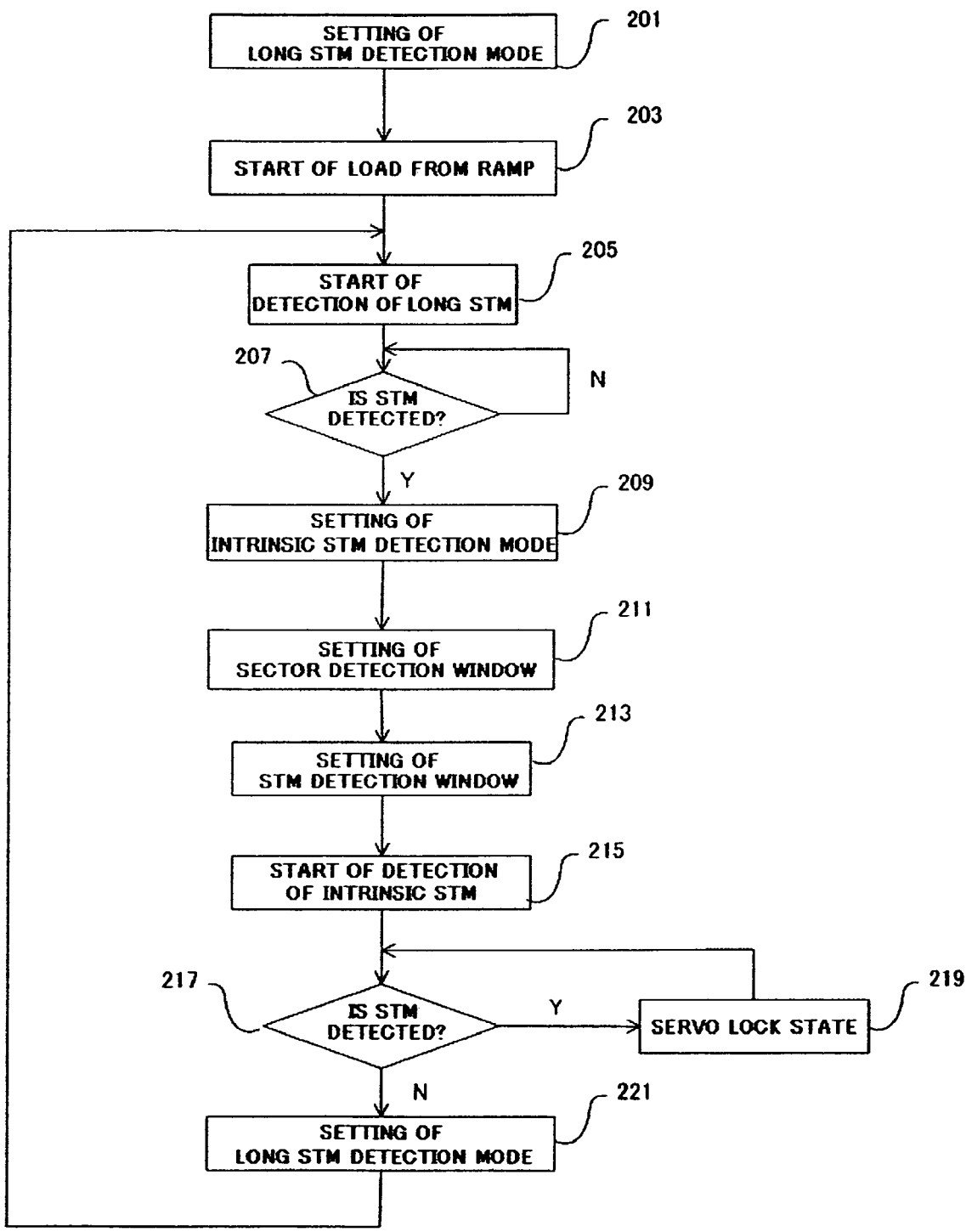
FIG. 4 is a flowchart showing a procedure of a reproduction method of servo data.
Figure 5:
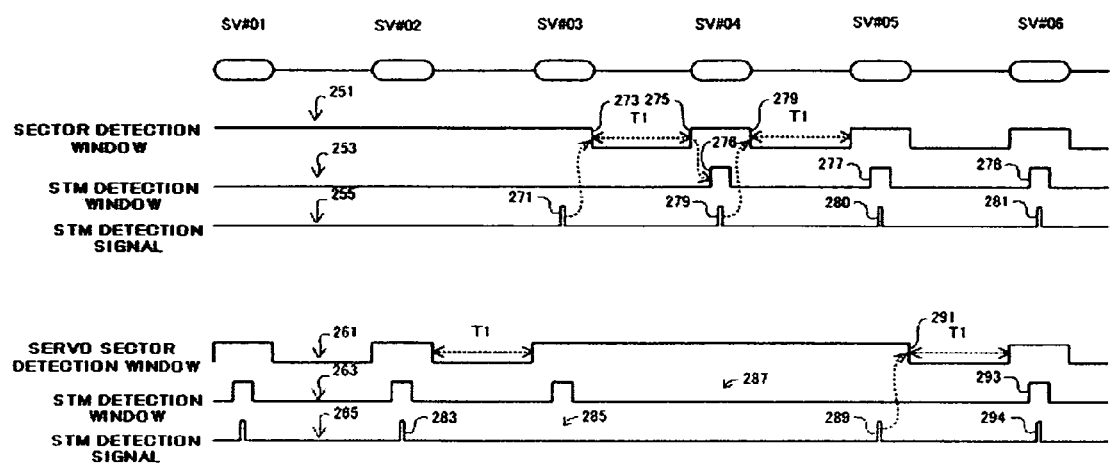
FIG. 5 is a timing chart when the servo data are reproduced according to the procedure of FIG. 4.

Next, a method of reproducing servo data using the pseudo-STM 57 in the magnetic disk system 100 is described with reference to FIG. 4 and FIG. 5. FIG. 4 is a flowchart showing the reproduction method of the servo data, and FIG. 5 is a timing chart when the servo data are reproduced. In FIG. 5, 6 servo sectors of SV#01 to SV#06 are arranged in order, and servo data are read by the reproduction head in this order. In FIG. 5, lines 251 and 261 show generation timing of the sector detection window, lines 253 and 263 show generation timing of the STM detection window, and lines 255 and 265 show generation timing of the STM detection signal.

In the magnetic disk 10, servo sectors corresponding to the bit pattern 51 shown in FIG. 1(B) are assumed to be formatted. In the magnetic disk system 100, servo data are written at a high frequency to enlarge the data area. Therefore, in the method of recognizing the 16-bit intrinsic STM 33 to generate the STM detection signal, when the sector detection window is kept in an opened state in the servo unlock state, a bit string extracted from the address information 35 and the burst pattern 37 of the servo data or a bit string extracted from the user data may be recognized as the intrinsic STM 33 and therefore the STM detection signal may be generated at false timing at comparatively high possibility. In the embodiment, the pseudo-STM 57 is used to reduce the possibility of falsely recognizing the different bit string as the intrinsic STM 33.

The STM detection circuit 155 is operated in either the long STM detection mode or the intrinsic STM detection mode on referring to contents of the status register of the STM pattern setting circuit 157.

In a block 201, the MPU 121 writes data for setting the STM detection circuit 155 in the long STM detection mode into the status register of the STM pattern setting circuit 157. The STM detection circuit 155 is operated on referring to the status register of the STM pattern setting circuit 157 such that when a bit string (11111111000001000001) of the 20-bit long STM is sent from the A/D conversion circuit 111, the circuit 155 recognizes the bit string and generates the STM detection signal.

The magnetic disk system 100 employs a load/unload method, and in a block 203, the magnetic head is loaded from a ramp onto the recording surface of the magnetic disk. In the embodiment, a CSS method may be employed instead of the load/unload method. Since the STM detection circuit 155 can not recognize the intrinsic STM 33 immediately after the magnetic head is loaded, the sector detection window generation circuit 159 can not set the sector detection window. Therefore, the system is in the servo unlock state. Therefore, the sector detection window generation circuit 159 keeps the sector detection window in an opened state between the servo sectors SV#01 and SV#03 as shown by the line 251.

Since the STM detection window generation circuit 156 has not received the window open signal from the sector detection window generation circuit 159, it closes the STM detection window. Accordingly, the STM detection circuit 155 is operated such that it recognizes the bit strings of the long STM from all the servo data and the user data read by the reproduction head (block 205). However, since the bit length of the long STM is long compared with that of the intrinsic STM 33, discriminating power of the long STM is high compared with other servo data or user data, consequently the STM detection circuit 155 may generate the STM detection signal at a false position at considerably low possibility.

In a block 207, whether the STM detection circuit 155 has recognized the long STM or not is determined. As shown in the lines 251 and 253, the long STM is not detected from the servo sectors SV#01 and SV#02. When the long STM is recognized from the servo sector SV#03 at a position 271 in the block 207, a process is shifted to a block 209. The STM detection circuit 155 that has recognized the long STM generates the STM detection signal and sends the signal to the STM pattern setting circuit 157, and sets a value of the status register to be in the intrinsic STM detection mode. The STM detection circuit 155 further sends the STM detection signal to the address information reproduction circuit 161, and thereupon the address information reproduction circuit 161 starts processing of the address information 35.

The address information reproduction circuit 161 processes the address information and then sends a window close signal to the sector detection window generation circuit 159, and thereupon the sector detection window generation circuit 159 closes the sector detection window at a position 273 (block 211). The sector detection window generation circuit 159 sends a start signal to the time measuring circuit 135 at the position 273, and thereupon the time measuring circuit 135 measures time T1 to a position 275 at which a subsequent sector detection window is opened. When the time measuring circuit 135 has measured the time T1, it sends a window open signal to the sector detection window generation circuit 159, and thereupon the sector detection window generation circuit 159 opens the sector detection window at a position 275.

In a block 213, the sector detection window generation circuit 159 measures the predetermined time and then sends a window open signal to the STM detection window generation circuit 156 at a position 276. The STM detection window generation circuit 156 generates the STM detection window for detecting the intrinsic STM at the position 276, and sends it to the STM detection circuit 155. In a block 215, the STM detection circuit 155 processes inputted bit strings to recognize the intrinsic STM only for a period while the STM detection window sent from the STM detection window generation circuit 156 is opened.

While the intrinsic STM is inferior in discriminating power with respect to other bit patterns compared with the 20-bit long STM because it is 16-bit STM, since the STM detection circuit 155 recognizes the bit patterns of the intrinsic STM only for the period while the STM detection window is opened, the circuit does not falsely recognize other data as the intrinsic STM. When the STM detection circuit 155 recognizes the intrinsic STM in a block 217, the process is shifted to a block 219. After the intrinsic STM has been recognized, the sector detection window and the STM detection window are generated in the same procedure and recognition operation of the intrinsic STM is repeated.

For the servo sectors SV#04 to SV#06, the STM detection window is generated at each of positions 276 to 278, and the intrinsic STM is recognized at each of positions 279 to 281. A state that the sector detection window is set and the intrinsic STM is recognized is called the servo lock state (block 219), and in this state, the servo data are reproduced to perform the servo control. To perform recording or reproduction of user data with respect to the magnetic disk 10, the magnetic disk system needs to be in the servo lock state.

The line 265 shows that the magnetic disk system 100 reads the intrinsic STM to the servo sector SV#02, and the STM detection signal is generated as shown in a position 283 and the system is in the servo lock state. In the servo sector #03, while the STM detection window was generated, the STM detection circuit 155 can not recognize the intrinsic STM as shown in a position 285, therefore the STM detection signal is not generated and the system is in the servo unlock state.

When a state that the intrinsic STM is not detected is given in the block 217, the process is shifted to a block 221, wherein the STM detection circuit 155 sends an STM lost signal to the STM pattern setting circuit 157. The STM lost signal is generated when the STM detection circuit 155 does not recognize the intrinsic STM in a period set by the STM detection window. The STM pattern setting circuit 157 that has received the STM lost signal sets the status register in the long STM detection mode, and the process is shifted to the block 205. The STM detection circuit 155 is operated in the long STM detection mode on referring to the status register of the STM pattern setting circuit 157 (block 205).

As shown in the line 261, the sector detection window is kept in the opened state for the servo sectors following the servo sector SV#03, and the system is in the servo unlock state. In the servo sector SV#04, since the long STM is not recognized, the STM detection window is not generated at a position 287. When the long STM is recognized in the servo sector SV#05, and the STM detection signal is generated at a position 289 (block 207), the sector detection window generation circuit 159 closes the sector detection window at a position 291 according to the window close signal generated by the address information reproduction circuit 161. The STM detection circuit 155 sends the STM detection signal to the STM pattern setting circuit 157 to update the status register, and after that it is operated in the intrinsic STM detection mode. The STM detection window is generated again at a position 293, and the STM detection circuit 155 recognizes the intrinsic STM 33 at a position 294 and generates the STM detection signal, and the magnetic disk system is into the servo lock state again.

Here, the reason why part of the AGC/PLL pattern can be used as the pseudo-STM 57 is described. In the embodiment, since part of the AGC/PLL pattern 31 is used as the pseudo-STM 57, discriminating power of the intrinsic STM 33 can be improved even if bit length is not increased. The AGC/PLL pattern is required to have the predetermined bit length to perform the gain adjustment of AGC or the phase synchronization adjustment of the servo clock, and includes the redundant bits 59 at the leading portion. When the magnetic disk system is in the servo lock state and records user data into the magnetic disk, the read/write channel or the head amplifier is set in the recording mode in the data area, and set in the reproduction mode in the servo sector.

When the recording head records the user data into the data area, the reproduction head intermittently reproduces the servo data in the servo sector. Therefore, since temporal loss occurs in the leading portion of the AGC/PLL pattern 31 for changing the mode of the magnetic disk system from the recording operation to the reproduction operation, the AGC/PLL pattern 31 is written with a pattern such that it is operated only in a region following the redundant bits 59 even if a portion of the redundant bits 59 is not reproduced.

When the magnetic disk system is in the servo unlock state and operated in the long STM detection mode, since the reproduction mode is kept in both the data area and the servo sector, time loss does not occur for changing the mode from the recording operation to the reproduction operation, therefore the redundant bits 59 also contribute to the gain adjustment or the phase synchronization adjustment. When the AGC/PLL pattern 31 is progressively reproduced including the leading redundant bits in the long STM detection mode, since the gain adjustment or the phase synchronization adjustment is completed before the pseudo-STM is reproduced, trouble is not caused even if the pseudo-STM 57 is used for complementing the intrinsic STM.

In other words, since the bit string of the pseudo-STM 57 is reproduced after the gain adjustment or the phase synchronization adjustment has been completed, the bit string can be operated as a pattern of the pseudo-STM. While the bit length of the redundant bits 59 and the bit length of the pseudo-STM are set to be equal in the embodiment, pseudo-STM may be set to be shorter than that of the redundant bits 59.

Accordingly, when part of the AGC/PLL pattern 31 is used as the pseudo-STM 57 in the servo unlock state, a pattern at the leading side except for the pseudo STM 57 is used, and when the intrinsic STM 33 is detected in the servo lock state, a pattern at a trailing side with respect to the redundant bits 59 is used. Accordingly, the same bit length can be reproduced from the AGC/PLL pattern 31 in either case, consequently functions of the AGC/PLL pattern 31 are not obstructed.

While description has been made using the bit pattern 51 in FIG. 1(B) as an example hereinbefore, the embodiment can be applied to a magnetic disk in a format structure corresponding to the bit pattern 53 or bit pattern 55. In the embodiment, when the STM detection window is set, even if the intrinsic STM having the small bit length is used, other data are not recognized as the intrinsic STM. When the sector detection window is kept in the opened state in the servo unlock state, since the STM detection window is not set, the STM detection circuit 155 is inputted with all bit strings of user data or address information of the servo sector or the like. However, since the STM detection circuit 155 is operated in the long STM detection mode at that time, those bit strings may be falsely recognized as the intrinsic STM at considerably low possibility. Part of the AGC/PCL pattern 31 is used as the pseudo-STM 57, thereby reproduction capability of the servo data can be improved without increasing the bit length of the intrinsic STM 33 or the bit length of the AGC/PCL pattern 31.

Figure 6:
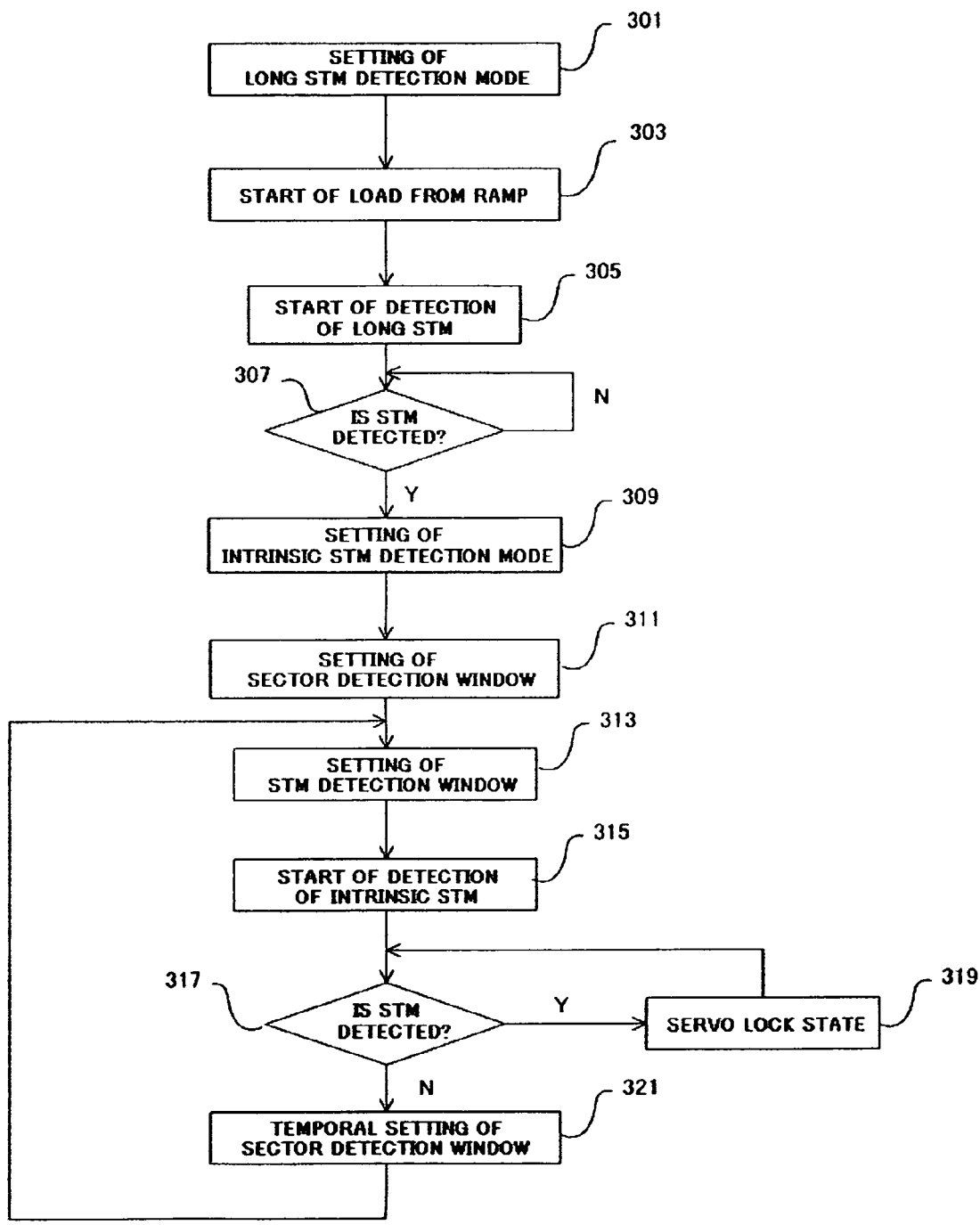
FIG. 6 is a flowchart showing another procedure of a reproduction method of servo data.
Figure 7:
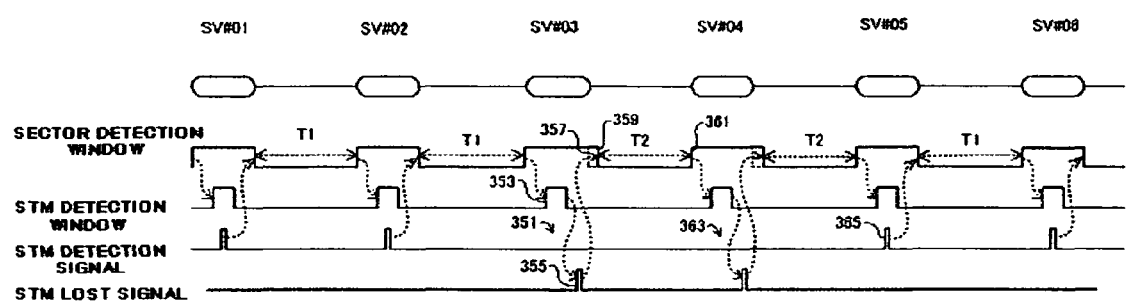
FIG. 7 is a timing chart when the servo data are reproduced according to the procedure of FIG. 6.

Next, a method of reproducing servo data by temporally setting a STM lost signal and a sector detection window in the magnetic disk system 100 is described with reference to FIG. 6 and FIG. 7. FIG. 6 is a flowchart showing a procedure of a reproduction method of a servo sector, and FIG. 7 is a timing chart in reproduction of the servo sector and in the same configuration as FIG. 5. In FIG. 7, between servo sectors SV#01 and SV#02, the servo lock state is continued, and the sector detection window is set to be opened with interval of time T1. Since blocks 301 to 319 in FIG. 6 correspond to the blocks 201 to 219 in FIG. 4, they are omitted to be described. For the servo sector SV#03, the STM signal is not generated at a position 351 because the intrinsic STM is not recognized (block 317).

Here, the STM detection circuit 155 determines at a position 353 that it was not able to recognize the intrinsic STM in a period while the STM detection window was opened, and generates a STM lost signal at a position 355 and sends the signal to the time measuring circuit 135. Since the STM lost signal is generated after the STM detection window was closed at the position 355, the STM lost signal is generated later than the timing when the STM detection signal is to be generated at a position 351. In a block 321, the STM detection circuit 155 sends the STM lost signal to the address information reproduction circuit 161, and thereupon the address information reproduction circuit 161 sends a window close signal to the sector detection window generation circuit 159. The sector detection window generation circuit 159 closes the sector detection window at a position 359, and sends a start signal to the time measuring circuit 135. The address information reproduction circuit 161 does not reproduce the address information 35 even if it receives the SMT lost signal.

This point is different from a fact that when the STM detection signal was not generated at the position 285 in FIG. 5, the sector detection window was in the opened state thereafter. The position 359 is a position later than a position 357 where the sector detection window was set to be closed when the SMT detection signal is generated. Therefore, the time measuring circuit 135 measures time T2 shorter than time T1, and sends a window open signal to the sector detection window generation circuit 159 in order to expect a position where the next servo sector SV#04 is started. The sector detection window generation circuit 159 that has received the window open signal opens the sector detection window at a position 361. A process is returned to the block 313 and the STM detection window is set therein, and whether the intrinsic STM was recognized or not is determined in the block 317.

From the servo sector SV#04, since the STM detection signal is not generated at a position 363, the same procedure is repeated so that the sector detection window generation circuit 159 generates the sector detection window. The sector detection window is not set by measuring the time T1 by the time measuring circuit 135. Setting of the sector detection window by measuring the time T2 according to the STM lost signal is assumed to be called temporal setting of the sector detection window. In the servo sectors SV#03 and SV#04, since the intrinsic STM 33 is not recognized, a system is in the servo unlock state.

When the intrinsic STM is subsequently recognized from the servo sector SV#05 and an STM detection signal is generated at a position 365, the system is into the servo lock state again (block 319), and the time measuring circuit 135 measures the time T1 and sends a window close signal to the sector window generation circuit 159. When the STM detection window is in a state of the temporal setting, the STM detection circuit 155 generates the STM lost signal when it can not recognize the intrinsic STM, and the time measuring circuit 135 measures the time T2 and opens the sector detection window at a position of a next servo sector. Therefore, since the sector detection window is also generated, false recognition of the intrinsic STM at a position of other servo data or user data is prevented even if the long STM is not used.

While the invention has been described with the particular embodiments shown in drawings hereinbefore, it will be appreciated that the invention is not limited to the particular embodiments shown in drawings, and it can be used for any configuration that has been previously known as long as the advantages of the invention can be exhibited.

What is claimed is:

1. A magnetic disk system employing a data surface servo system, comprising:
    a magnetic disk in which a plurality of servo sectors, each of which is written with servo data including an automatic gain control/phase locked loop (AGC/PLL) pattern, servo timing mark (STM) following the AGC/PLL pattern, and address information following the STM, are formatted,
    a magnetic head that reads the servo data in the servo sectors,
    an STM detection circuit that recognizes either long STM configured by part of the AGC/PLL pattern and the STM, or the STM, and generates an STM detection signal, and
    a sector detection window generation circuit that sets a sector detection window that defines a period in which the servo sectors are reproduced in response to the STM detection signal;
    wherein when the STM detection circuit does not recognize the STM, the sector detection window is kept in an opened state, and the STM detection circuit recognizes the long STM from a servo sector that is read by the magnetic head later than a servo sector from which the STM is not recognized, and generates the STM detection signal.

2. The magnetic disk system according to claim 1:
    wherein the sector detection window generation circuit sets a sector detection window for a servo sector that is read by the magnetic head later than a servo sector from which the long STM is recognized, and the STM detection circuit recognizes only the STM from a servo sector for which the sector detection window was set, and generates the STM detection signal.

3. The magnetic disk system according to claim 1:
    wherein when the sector detection window is in an opened state immediately after the magnetic head is loaded onto the magnetic disk, the STM detection circuit recognizes the long STM and generates the STM detection signal.

4. The magnetic disk system according to claim 1:
    wherein the long STM is configured by a successive pattern of a trailing portion of the AGC/PLL pattern and the STM.

5. The magnetic disk system according to claim 4:
    wherein pattern length of the trailing portion of the AGC/PLL pattern configuring the long STM corresponds to pattern length along which a leading portion of the AGC/PLL pattern passes through the magnetic head in a period while a mode of the magnetic disk system is changed from recording operation to reproduction operation of the servo data.

6. The magnetic disk system according to claim 1:
    wherein the servo sector is formatted in a condition of removing redundant bits from the address information.

7. A magnetic disk system employing a data surface servo system, comprising:
    a magnetic disk in which a plurality of servo sectors, each of which is written with servo data including an automatic gain control/phase locked loop (AGC/PLL) pattern, servo timing mark (STM) following the AGC/PLL pattern, and address information following the STM, are formatted,
    a magnetic head that reads the servo data in the servo sectors, an STM detection circuit that, when a sector detection window that defines a period in which the servo sectors are reproduced is set, generates an STM detection signal when the circuit recognizes the STM, and generates an STM lost signal when the circuit does not recognize the STM, a time measuring circuit that measures time to opening the sector detection window in response to the STM lost signal for a servo sector that is read by the magnetic head later than a servo sector from which the STM is not recognized, and generates a window open signal, and a sector detection window generation circuit that temporally sets the sector detection window in a way that the circuit closes the sector detection window in response to the STM lost signal, and opens the sector detection window in response to the window open signal, wherein the system includes an STM detection window generation circuit that defines a period in which the STM is recognized in response to timing when the sector detection window is opened, and the STM detection circuit generates the STM lost signal when the circuit does not recognize the STM in a period while the STM detection window is opened, and wherein the STM detection window is narrower than the sector detection window.

8. The magnetic disk system according to claim 7:

wherein the time measuring circuit measures time shorter than time between timing of closing the sector detection window set in a servo lock state and timing of opening the window, in response to the STM lost signal.

9. The magnetic disk system according to claim 7:

wherein when the STM detection circuit generates the STM detection signal within a period while the sector detection window generation circuit opens the sector detection window in response to the window open signal, the sector detection window generation circuit sets the sector detection window in response to the STM detection signal.

10. A method of reproducing servo data in a magnetic disk system in a data surface servo system, the disk system having a magnetic disk in which a plurality of servo sectors written with servo data including an automatic gain control/phase locked loop (AGC/PLL) pattern, intrinsic servo timing mark (STM) following the AGC/PLL pattern, and address information following the intrinsic STM are formatted, the method comprising:

a step of providing a long STM detection mode for recognizing long STM configured by pseudo-STM forming part of the AGC/PLL pattern and the intrinsic STM, a step of providing an intrinsic STM detection mode for recognizing the intrinsic STM, a step of providing a sector detection window that defines a period in which the servo sectors are reproduced, a step of opening the sector detection window when the intrinsic STM is not recognized and selecting the long STM detection mode, a step of recognizing the long STM when the long STM detection mode is selected and generating an STM detection signal, and a step of closing the sector detection window in response to the STM detection signal.

11. The method of reproducing the servo data according to claim 10:

wherein the step of providing the long STM detection mode includes a step of setting the pseudo-STM such that the pseudo-STM is continued to the intrinsic STM at a trailing side of the ACC/PLL pattern.

12. The method of reproducing the servo data according to claim 10:

wherein the step of selecting the long STM detection mode includes a step of continuously opening the sector detection window until the long STM is recognized.

13. The method of reproducing the servo data according to claim 10, further comprising:

a step of selecting the intrinsic STM detection mode after the long STM was recognized.

14. The method of reproducing the servo data according to claim 10:

wherein the step of selecting the long STM detection mode includes a step of performing the step immediately after a magnetic head is loaded onto the magnetic disk.

15. The method of reproducing the servo data according to claim 10:

wherein the step of selecting the long STM detection mode includes a step of performing the step when the system is in a state where the intrinsic STM is not recognized after the system was into a servo lock state.

16. The method of reproducing the servo data according to claim 10, further comprising:

a step of setting an STM detection window after the long STM was recognized, the window defining a period in which the intrinsic STM is recognized.

17. A method of reproducing servo data in a magnetic disk system in a data surface servo system, the system having a magnetic disk in which a plurality of servo sectors written with servo data including an automatic gain control/phase locked loop (AGC/PLL) pattern, servo timing mark (STM) following the AGC/PLL pattern, and address information following the STM are formatted, the method comprising:

a step of setting a sector detection window that defines a period in which a data sector is reproduced to recognize the STM, and thus keeping a servo lock state, a step of generating an STM lost signal when the STM is not recognized in the servo lock state, a step of closing the sector detection window in response to the SMT lost signal, a step of measuring time from closing of the sector detection window to next opening of the sector detection window, a step of opening the sector detection window in response to the measured time, and a step of setting an STM detection window that defines a period in which the STM is recognized in response to the step of opening the sector detection window, and wherein the STM detection window is narrower than the sector detection window.

18. The method of reproducing servo data according to claim 17, further comprising:

a step of temporally setting the sector detection window to recognize the STM such that the step of generating the STM lost signal, the step of closing the sector detection window, the step of measuring the time, and the step of opening the sector detection window are repeated.

* * * * *